June 16, 1931.  O. F. SHEPARD  1,810,441
MOTOR CONTROL
Filed Sept. 26, 1923  4 Sheets-Sheet 1

Inventor
OSCAR F. SHEPARD
By Walter F. Murray
Attorney

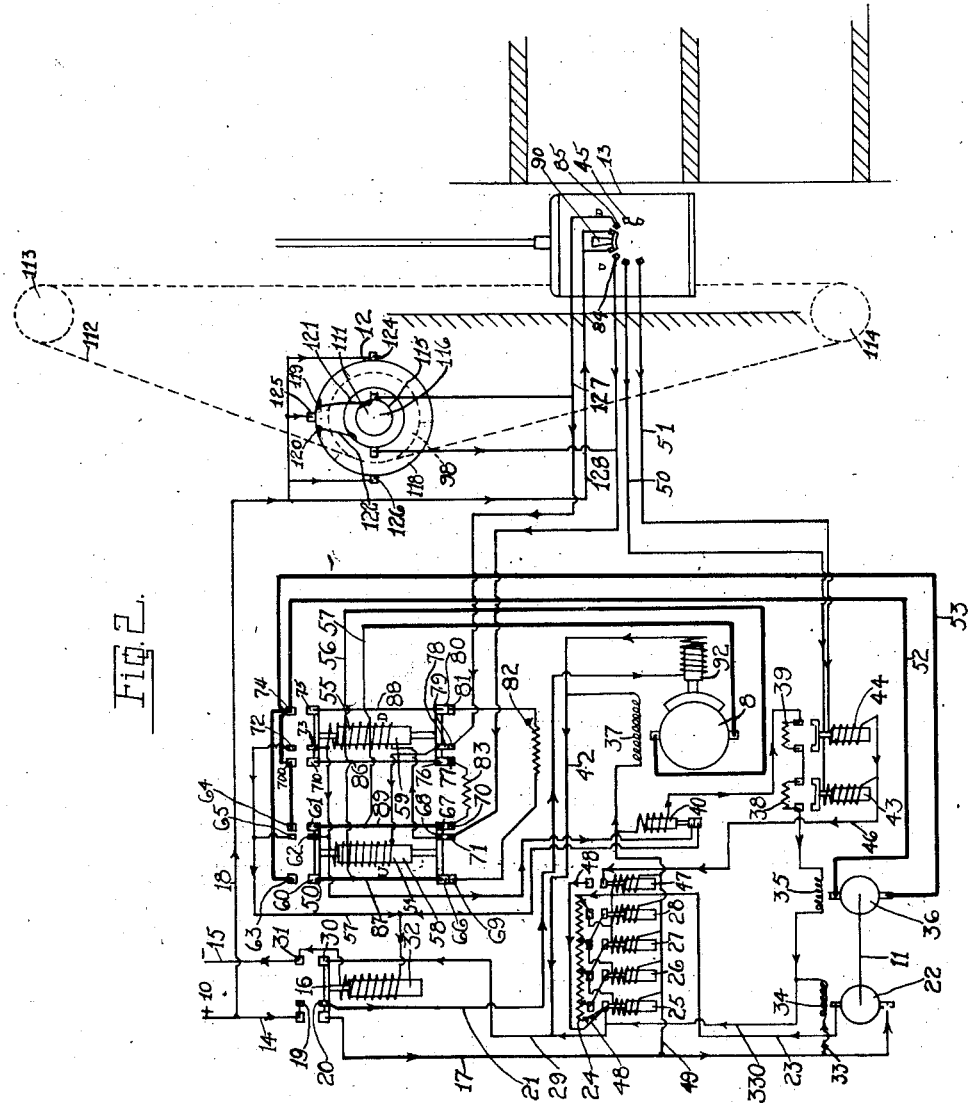

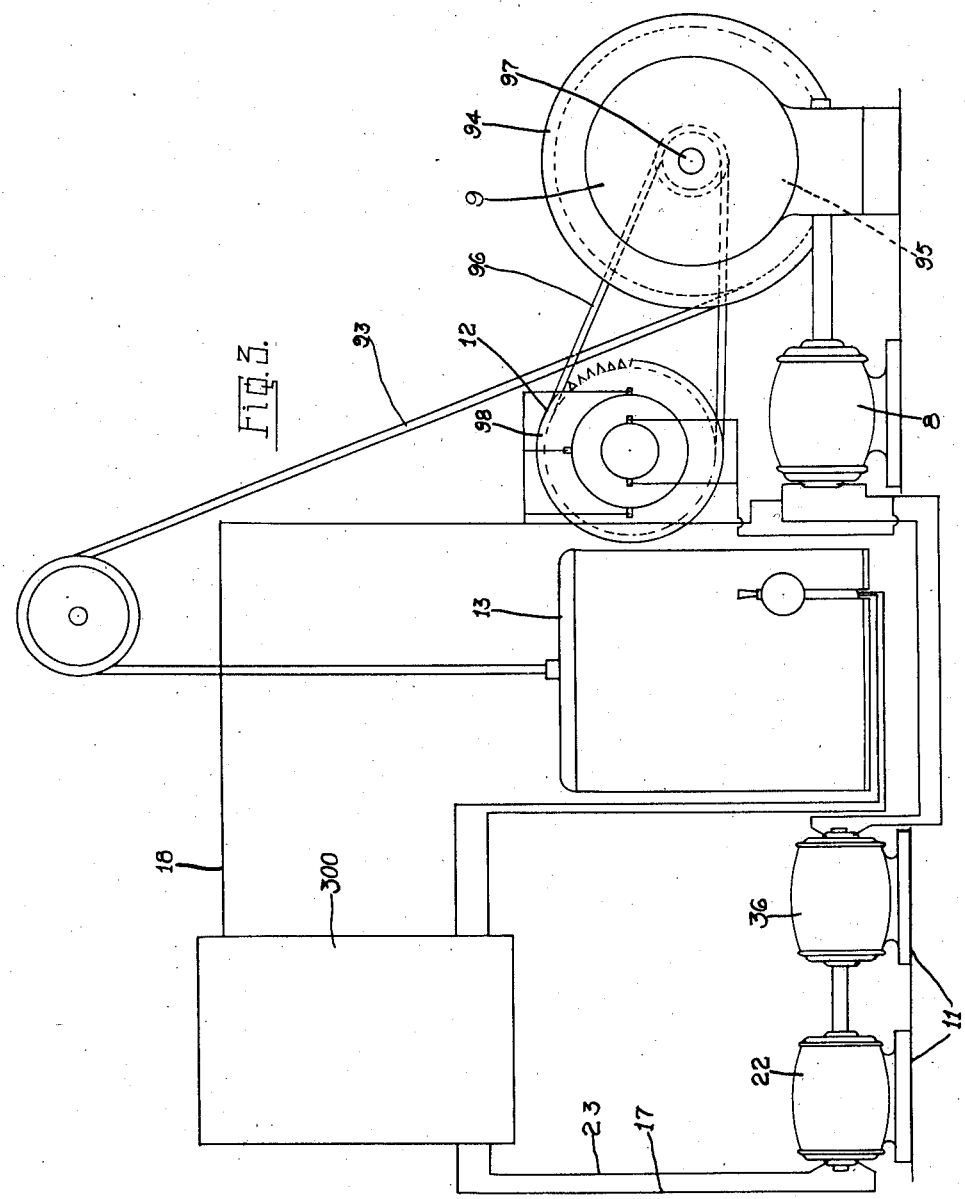

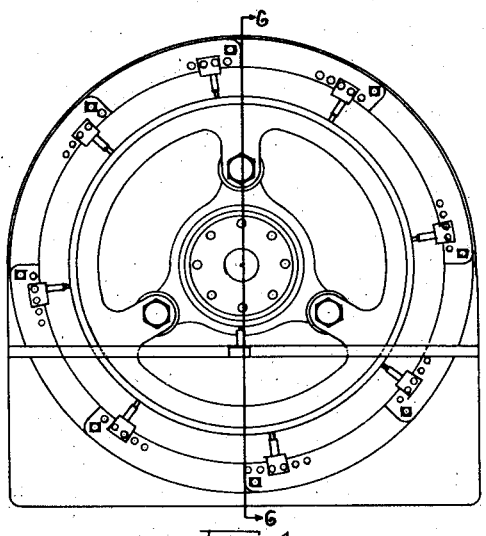
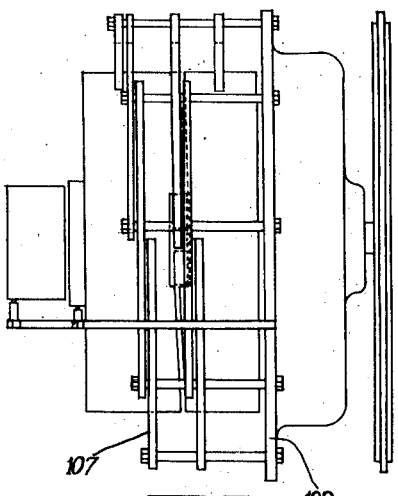
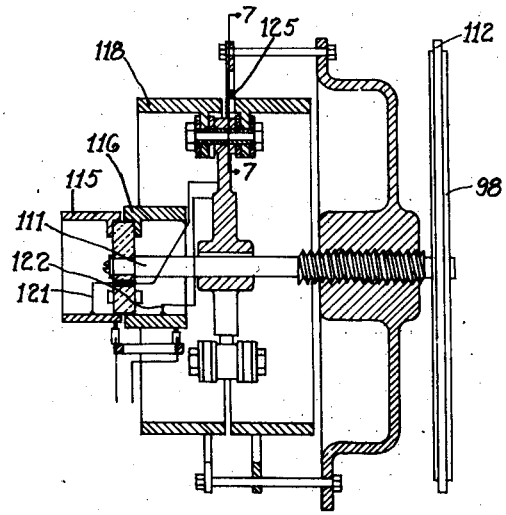
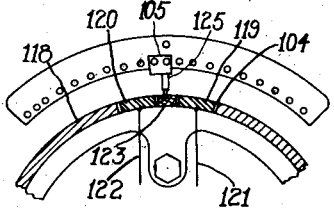

Patented June 16, 1931

1,810,441

UNITED STATES PATENT OFFICE

OSCAR F. SHEPARD, OF CINCINNATI, OHIO

MOTOR CONTROL

Application filed September 26, 1923. Serial No. 664,822.

My invention relates particularly to elevators and electrical apparatus to operate and control the elevator car although it is applicable to the control of motors for other purposes.

An object of my invention is to provide means for effecting a smooth acceleration and retardation.

Another object is to provide a control means for the purpose stated that is equally applicable to direct current and alternating current source of power supply and that will have a great range between minimum and maximum speeds.

Another object of my invention is to provide means for the purposes stated that are simple and efficient in operation.

Another object is to provide means for automatically leveling an elevator cab with the floor landing.

These and other objects are attained by the means described herein and disclosed in the accompanying drawings, in which:

Fig. 2 is a view similar to Fig. 1 but arranged for a direct current source of power supply.

Fig. 3 is a diagrammatic view showing the general relationship of the various co-operating means employed in carrying out my invention.

Fig. 4 is a front elevation of a dial forming a detail in the automatic control mechanism.

Fig. 5 is a side elevation of the device shown in Fig. 4.

Fig. 6 is a sectional view on line 6—6 of Fig. 4.

Fig. 7 is an enlarged sectional view on line 7—7 of Fig. 6.

Figure 1:
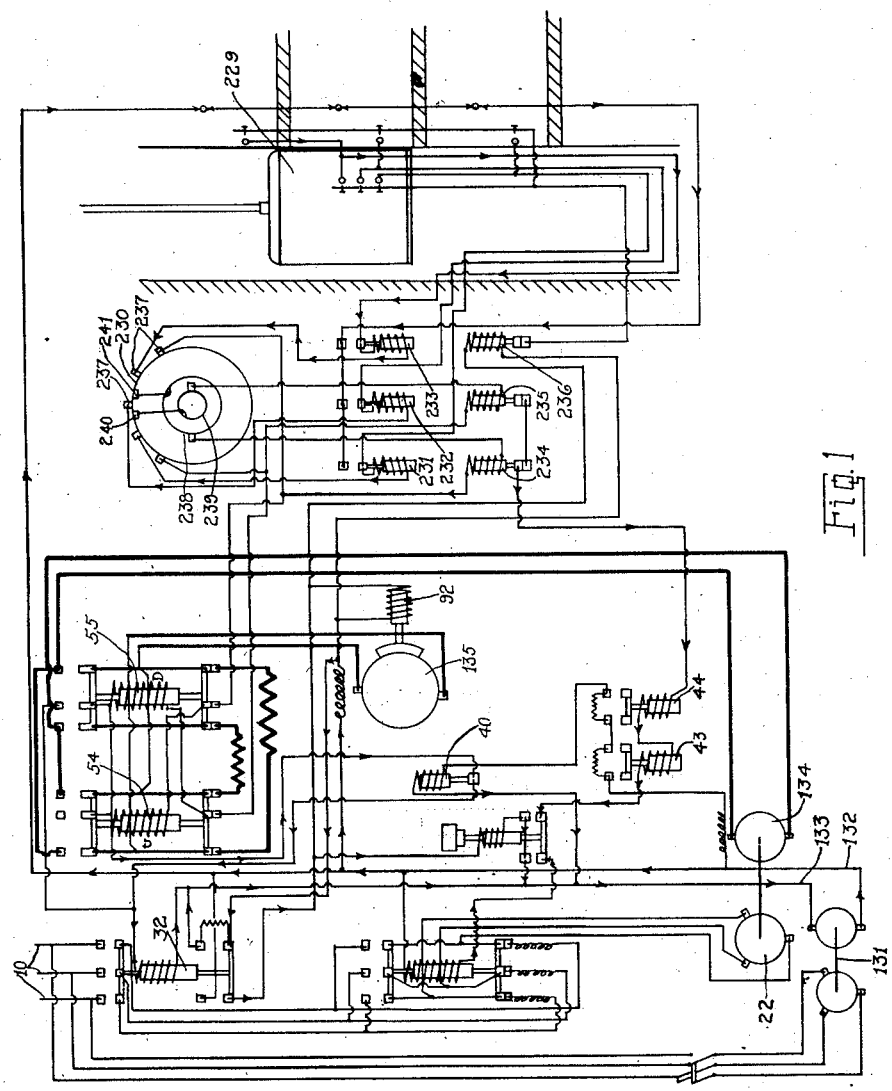
Fig. 1 is a diagrammatic view of the wiring employed with my invention when an alternating current source of power supply is employed.

My invention in general comprises the usual hoisting motor 8 together with the standard type of hoisting and brake apparatus 9, a source of main power supply 10, an auxiliary motor generator unit 11 and an automatic floor leveling device 12 for cooperatively controlling the elevator cab 13. The auxiliary motor generator unit 11 is connected to the power supply 10 and disconnected from said power supply on starting and stopping the elevator. The elevator motor 8 is controlled by variable voltage from the generator 37 of the motor generator unit 11 by varying the field strength of the generator 36.

The invention is explained in the first instance as applied to a system wherein the current source of power supply is direct current. This is disclosed in Fig. 2.

The current source of power supply 10 is designated as constituting a positive pole 14 and a negative pole 15. A main switch 16 controls the flow of electrical energy from the positive pole 14 to the generator unit 11 by way of a main feed wire 17. An auxiliary feed wire 18 is connected with the positive pole 14 outside of the main switch 16. The main switch comprises supplemental lead wire 21. The main feed wire 17 is connected directly with the motor 22 of the motor generator unit 11 and the main return wire 23 leading from the motor 22 is electrically connected with a starting resistance 24, portions of which starting resistance may be bridged out of the circuit by suitable accelerating relays 25, 26, 27 and 28. The wire 29 is a continuation of the main return wire 23 and completes the connection between the motor 22 and the contact 30 of the main switch. The contact 30 is adapted to engage the contact 31 of the negative pole 15. The main switch may be controlled by a suitable electromagnet 32, the wiring of which will be explained hereafter. The field 34 of the motor 22 is connected across the main power source by way of conductors 33 and 330 and main return 29. The field 35 of the generator 36 is connected across the main power source by way of conductor 49, relay 40, resistances 38 and 39, and conductor 330. The field 37 of the elevator motor 8 is connected across the main power source by way of conductor 49 and when the main switch 16 is closed the fields of motors 22 and 8 are fully excited and the field of generator 36 is weakly excited. Motor 22 is quickly accelerated and motor 8 is started slowly due to low voltage created by the generator 36. The resistances 38 and 39 may be bridged out by means of speed magnets 43 and 44 controlled from a suitable control mechanism 45 associated with the elevator cab 13. Electrical energy is supplied to the speed magnets 43 and 44 from the wire 18 connected with the positive pole 14 outside of the switch 16, by way of the manually controlled device 45, and the conductors 50 and 51. The return from the speed magnets 43 and 44 is by way of conductor 46, the relay 47 controlling the speed magnets 43 and 44 and conductor 48 electrically connected with the return 29. The relay 47 is connected across the armature of motor 22 from the main feed wire and closes when the motor 22 is practically up to speed or when the counter E. M. F. of motor 22 is high enough to actuate the relay. The generator 36 is connected with the elevator motor 8 by way of conductors 52 and 53, the reversing switches 54 and 55, and conductors 56 and 57. The relay 40 is connected in series with the field 35 of generator 36 and is so related to the various parts of the device that it serves the purpose of requiring the generator field to be at a minimum when the elevator motor 8 is reversed or started quickly after a stop. For accomplishing this co-operation the reversing switches are of the following structure. The switches are substantially identical. The electromagnet 58 is operative for bringing the contacts 60, 61 and 62 in and out of electrical connection with the contacts 63, 64, and 65 and for bringing the contacts 66, 67 and 68 into and out of electrical connection with the contacts 69, 70 and 71. The electromagnet 59 in like manner controls electrical connection between contacts 700, 710, 72, 73, 74, 75, 76, 77, 78, 79, 80 and 81. The contact 60 is electrically connected with the contact 66, 61 is connected with 67, 710 is connected with 76, and 75 is connected with 80. The contacts 65 and 72 are electrically connected with one another, with the conductor 570 and the coil of the electromagnet 32. The coil of the electromagnet 32 is electrically connected with the contact 31 of the main switch. The contact 69 is connected with the contact 81 through the resistance 82 and the contact 77 is connected with the contact 70 through resistance 83. Resistances 82 and 83 are dynamic resistances. The contact 68 associated with switch 54 is electrically connected with the coil of the electromagnet 59 and contact 78 associated with switch 55 is electrically connected with the coil of the magnet 58. The contacts 71 and 79 are connected with the contacts 84 and 85 respectively on opposite sides of the vertical center of the manual conductor device 45, and serve to control the direction of movement of the elevator cab 13. The coils of the electromagnets 58 and 59 also make an electrical connection through contacts 62 and 73 with the contacts 65 and 72 respectively. The conductor 56 connected with the elevator motor 8 is electrically connected with the conductors 86 and 87 connecting the contacts 710 and 76 of the switch 55 and contacts 60 and 66 of the switch 54. The conductor 57 leading from the elevator motor 8 is electrically connected with conductors 88 and 89 connecting contacts 75, and 80 of the switch 55 and contacts 61 and 67 of switch 54. Assuming that when the control lever 90 of the manual control 45 is moved to the right that the elevator cab will move upwardly, the switch 54 would be actuated for closing the elevator motor circuit through contacts 60, 61, 63 and 64. When the lever 90 is moved to the left beyond the vertical center the switch 55 is employed for completing the elevator motor circuit through contacts 700, 710, 74 and 75 the elevator would move downwardly. For distinguishing these functions more readily I have indicated one side of the manually control device 45 with the letter U indicating upward and the opposite side with the letter D indicating downward. A corresponding designation has been inserted adjacent the switches 54 and 55 as are actuated for effecting upward or downward movement of the elevator.

The brake magnet 92 is connected with the contact 20 of the main switch and the return 29 so that it is energized simultaneously with the operation of the main switch and with either one of the reversing switches 54 and 55. The dynamic resistances 82 and 83 co-operate with the brake magnets in effecting a braking action.

The automatic control device 12 is wired in parallel with the contacts 84 and 85 that are arranged for slow speed, consequently the automatic control device 12 operates at slow speed.

In order to clarify the flow of electrical energy, arrow heads have been applied to the various conductors showing the direction of flow of current through such conductors.

As disclosed diagrammatically in Fig. 2, means designated as 12 are provided for automatically leveling the elevator with a given floor. The device is shown for operation between three floors although its use is not restricted to any given number of floors. The automatic floor leveling device 12 comprises a shaft 111 carrying a sprocket 98 and about which a chain 112 may pass, the chain having its opposite ends connected with the elevator 13 and passing over suitable pulleys 113 and 114. Suitable speed translating devices may be interposed for reducing the relative speeds of the elevator and shaft 111. Any suitable mechanism other than that disclosed may be employed for retaining the elevator cab and the automatic device 12 in a synchronized relationship. The conductor rings 115 and 116 are electrically connected with contacts 120 and 119 respectively, both said contacts being disposed within an opening 104, see Fig. 7, in the drum 118. This wiring is diagrammatically disclosed in Fig. 2, the wires being indicated as 121 and 122. An insulating block 123 is preferably inserted between the contacts 119 and 120. Brushes 124, 125 and 126, shown in Fig. 2, engage the drum 118 and are adapted to contact with the contact blocks 119 and 120 whereby to complete circuits after the manually operable handle 90 is moved to its normal or inoperative position. It should be noted that the conductor rings 115 and 116 are connected with the conductors 127 and 128 connecting contacts 85 and 84 respectively of the manually operable device 45 with the reversing switches 54 and 55. The contacts 124, 125 and 126 together with the contact blocks 119 and 120 control the positioning of the elevator at separate floors or landings. It will be noted that the contacts 124, 125 and 126 are live contacts and that when they are placed in circuit with either contact 119 or 120 an auxiliary circuit parallel to the circuit passing through the low speed contacts of the manually operable device 45 is established, consequently if the circuits through the contacts of the manually operative device are broken the circuit will be maintained through the automatic device 12 whereby to continue the operation of the elevator motor 8 on slowest speed until the drum 118 is moved to such a position that the insulating block such as 123 shown in Fig. 7 registers with a live contact 124, 125 or 126, as the case may be, thereby causing the breaking of the circuit through the main switch to the motor 22, and reversing switches 54 and 55 and cutting off all power and applying the brake.

By reference to Fig. 6 it will be apparent that the rotation of shaft 111 causes same to move longitudinally of itself and relative to supporting housing 102, which housing carries plates 107, on which plates are mounted floor contacts or brushes 124, 125 and 126. The longitudinal movement of the shaft together with the drum and contacts carried thereby permits the mounting of additional contacts or brushes such as 124, 125 and 126 about the drum for additional floors between which the elevator may operate.

Figs. 4 and 5 show how additional floor contacts such as 124 may be mounted about the drum.

Fig. 3 shows somewhat diagrammatically the arrangement of some of the devices employed in carrying out my invention. These elements may be placed in other positions as practice may suggest. The drum or traction sheave 94 about which the elevator cable 93 extends, may be disposed at the head or top of the shaft containing the cab 13. The shaft 97 carrying the drum or sheave is driven from the motor 8 in any suitable manner such as a worm and worm wheel drive. In lieu of the synchronizing means shown in Fig. 2, the cable 96 shown in Fig. 3 may be employed for retaining the automatic floor leveler device in proper operating relationship with the cab 13.

In Fig. 1 an automatically controlled elevator system is shown diagrammatically in combination with a structure embodying my invention. Whereas any suitable automatic elevator control system may be employed in lieu of that disclosed, a detailed explanation is unnecessary. The drum 230 operates in synchronism with the elevator cab 229 and carries suitable means whereby to control the operation of the cab. The system is shown for operation between three floors and comprises the customary floor magnets 231, 232 and 233, the direction controlling coils 234 and 235 and the speed control coil 236. The drum 230 may be rotated and moved longitudinally and may carry suitable contacts for engagement with suitable floor brushes 237. The drum may have associated with it suitable conductor rings 238 and 239 and contacts 240 and 241 similar to rings 115 and 116 and contacts 119 and 120 shown in Figs. 6 and 7.

In the operation of my device as exemplified in Fig. 2, the lever 90 would be actuated by an operator whereby electrical energy would pass from the wire 14 to 18, either contact 84 or 85, through the interlocking direction controlling switches 54 and 55, through the coil of the electromagnet 32 and to the negative pole 15 by way of the contact 31. As a result of the closing of this circuit, the main switch 16 would be closed simultaneously with the operation of the direction controlling switches 54 and 55. The closing of the main switch will cause the motor 22 and the generator 36 to be actuated and the energy generated by the generator 36 will cause the operation of the elevator motor 8. The closing of the circuit embracing the motor 22 causes the closing of the circuits embracing the accelerating relays 25, 26, 27 and 28 and the successive operation of said relays will cut out or bridge out various portions of the resistance 24 thereby increasing the speed of the motor 22. The motor 22 speeds up quickly because it has practically no load. After the lever 90 is moved so as to bring the conductor 16 into communication with conductors 50 and 51 the speed magnets 43 and 44 are actuated whereby to bridge the resistances 38 and 39 thereby building up the field 35 of the generator 36 and thereby accelerating the elevator motor 8. The operation of the interlocking direction controlling switches 54 and 55 is well understood in the art and further explanation in this regard is deemed unnecessary. When the lever 90 is moved to its neutral or inoperative position the circuit through the conductor 18 and contacts 84 and 85 is maintained by way of the automatic control 12 whereby the main circuit embracing the motor 22 is retained in a closed condition until the circuit through the automatic control device 12 is broken as previously explained. From the foregoing it will be apparent that if the operator should permit the elevator to pass a desired floor landing and should then move the lever 90 to a neutral position the completing of the circuit through the contact 119 or 120 that may be in engagement with the brush 124, 125 or 126 will cause a reversal in the direction of movement of the elevator whereby to level the elevator with the landing.

In Fig. 1 a system embodying my invention is disclosed as embodying an automatically operated elevator 229 by a suitable automatic control device 230. The device 230 may be of any of the generally accepted types of automatic control devices used for this purpose.

The operation of the parts is similar to that described in reference to Fig. 2. In addition to the structure disclosed in Fig. 2, the main source of electric supply serves to at all times operate a small generating unit 131 for providing a direct current for exciting the field of the generator 134 corresponding to the generator 36 of the direct current system and the field of the elevator motor 135 corresponding to the elevator motor 8 in the direct current system. This direct current is also used in controlling the operation of the various parts. In other respects the systems are similarly operated. The various control magnets disclosed below the automatic operating device 230 are of the type generally employed with automatically controlled elevators as designated at 229.

Except for the dissimilar reference characters given to the generator and the elevator motor shown in Fig. 1, similar characters represent similar functioning devices in both the alternating and direct current structures.

From the foregoing it will be readily apparent that the motor 22 may be properly referred to as a primary motor and the elevator motors 8 and 135 as secondary motors.

It should be noted that although the elevator is to be stopped and the current is cut off from the motor 22 yet the armatures of the motor generator unit 11 may still be revolving, consequently should the elevator then be started up the unit is adapted to quickly pick up momentum for moving the elevator. It should also be noted that if the direction of the elevator be changed quickly that there is a breaking down of the field of the generator 35 but the fields of motor 22 and elevator motor 8 remain energized by the counter E. M. F. of the motor 22 running by its momentum, and that the field of the generator may be quickly built up as the motor generator unit 11 acquires momentum wherefore there is practically no delay in the adjustment of the parts to the change in direction of elevator movement.

In Fig. 3, 300 indicates a diagrammatical switch board.

What I claim is:

1. The combination of a source of power supply, a primary motor, a generator driven by the primary motor, a secondary motor, means for energizing and de-energizing the primary motor, means for varying the field strength of the generator for providing variable voltage for the secondary motor, and reversing switches for reversing the flow of current to the secondary motor armature, the reversing switches being simultaneously actuated with the means for energizing and de-energizing the primary motor.

2. In an elevator control the combination of a primary motor, a generator operated from the primary motor, a secondary motor controlled by the generator, a source of electrical supply for the armature of the primary motor, means for connecting and disconnecting the primary motor with the electrical supply, and means interposed between the generator and the secondary motor for controlling the direction of current through the armature of the secondary motor for controlling the direction of movement of the armature, and simultaneously operated with the first mentioned means.

3. In an elevator control the combination of an elevator car, a motor for moving the elevator car, a motor generator unit for actuating the armature of the motor, a source of power supply for the motor generator unit, an electric brake magnet, electric speed magnets and an exciter unit comprising a small motor and generator for exciting the fields of the first mentioned motor generator and the electric motor, and for supplying energy for operating the electric magnets.

4. The combination of a source of power supply, a primary motor, a generator driven by the primary motor, a secondary motor, means for connecting and disconnecting the primary motor with the source of power supply, an electric brake, a second motor generator unit connected to the source of power supply for exciting the fields of the generator and secondary motor and for operating the electric brake, and reversing switches for the secondary motor armature actuated simultaneously by the means for energizing and de-energizing the primary motor and electric brake.

5. The combination with a source of power supply, a motor generator unit, means for connecting and disconnecting the motor generator unit and the source of power supply, a work motor, means connected with the source of power supply for exciting the fields of the generator and work motor and means for reversing the work motor armature, said means being automatically and simultaneously actuated with the means for connecting and disconnecting the motor generator unit and the source of power supply.

In testimony whereof, I have hereunto subscribed my name this 10th day of September, 1923.

OSCAR F. SHEPARD.